US012678783B2

(12) United States Patent
Li et al.

(10) Patent No.: US 12,678,783 B2
(45) Date of Patent: Jul. 14, 2026

(54) DROPLET GENERATION METHOD, SYSTEM AND APPLICATION

(71) Applicants: BEIJING ZHIYU BIOTECHNOLOGY LTD., Beijing (CN); SHANGHAI YUANZAN SMART MANUFACTURING PHARMACEUTICAL TECHNOLOGY LTD., Shanghai (CN); WUHAN IGENEBOOK BIOTECHNOLOGY CO., LTD., Wuhan (CN)

(72) Inventors: Ang Li, Beijing (CN); Dezhen Peng, Beijing (CN); Yang Zhou, Beijing (CN)

(73) Assignees: BEIJING ZHIYU BIOTECHNOLOGY LTD., Beijing (CN); SHANGHAI YUANZAN SMART MANUFACTURING PHARMACEUTICAL TECHNOLOGY LTD., Shanghai (CN); WUHAN IGENEBOOK BIOTECHNOLOGY CO., LTD., Wuhan (CN)

( * ) Notice: Subject to any disclaimer, the term of this patent is extended or adjusted under 35 U.S.C. 154(b) by 671 days.

(21) Appl. No.: 18/148,523

(22) Filed: Dec. 30, 2022

(65) Prior Publication Data

US 2023/0149918 A1 May 18, 2023

Related U.S. Application Data

(63) Continuation of application No. PCT/CN2022/088669, filed on Apr. 24, 2022.

(30) Foreign Application Priority Data

Jun. 24, 2021 (CN) ......................... 202110705486.9
Nov. 11, 2021 (CN) ......................... 202111335113.3
Nov. 11, 2021 (CN) ......................... 202111335117.1

(51) Int. Cl.
*B01L 3/02* (2006.01)

(52) U.S. Cl.
CPC ....... *B01L 3/0268* (2013.01); *B01L 2200/027* (2013.01); *B01L 2400/0433* (2013.01); *B01L 2400/0478* (2013.01)

(58) Field of Classification Search
None
See application file for complete search history.

(56) References Cited

U.S. PATENT DOCUMENTS 3,946,398 A * 3/1976 Kyser .................. B41J 2/04581 347/45
6,203,759 B1 * 3/2001 Pelc .................. G01N 35/1065 73/863.02

(Continued)

FOREIGN PATENT DOCUMENTS

CN 208711740 U 4/2019
CN 110066857 B 3/2020

(Continued)

OTHER PUBLICATIONS

First Office Action for the priority No. 202111335113.3 issued in China on Jun. 28, 2022.

*Primary Examiner* — Brian R Gordon
(74) *Attorney, Agent, or Firm* — Schmeiser Olsen PLLC

(57) ABSTRACT

Disclosed are a droplet generation method, system and application thereof. The method breaks through the limitation that the existing nanoliter scale droplet generation technology must use micro-channels below 0.1 mm, and can realize the preparation of small-volume uniform droplets at a reduced cost. The system includes a droplet generation device and a droplet receiver, the droplet generation device includes an accommodating cavity with a variable volume, (Continued)

a control mechanism for controlling the volume of the accommodating cavity to change periodically, and a droplet generation tube, which has a wide range of applications in clinical diagnosis, gene expression analysis, microorganism detection and other fields.

20 Claims, 13 Drawing Sheets

(56) References Cited

U.S. PATENT DOCUMENTS

| | | | | |
|---|---|---|---|---|
| 8,273,307 | B2 * | 9/2012 | Eickhoff | G01N 35/10 422/520 |
| 8,287,806 | B2 * | 10/2012 | Bjornson | G01F 23/185 422/534 |
| 2002/0121529 | A1 * | 9/2002 | Hoummady | B01L 3/0268 222/113 |
| 2006/0147313 | A1 * | 7/2006 | Zengerle | B01L 3/0268 417/44.1 |
| 2012/0304929 | A1 * | 12/2012 | Ivri | B05B 15/62 118/712 |
| 2013/0037623 | A1 * | 2/2013 | Yamaguchi | G01N 35/1016 239/11 |
| 2015/0050719 | A1 * | 2/2015 | Bammesberger | B05B 17/06 435/283.1 |
| 2016/0202281 | A1 * | 7/2016 | Fang | B01L 3/50273 506/10 |
| 2017/0203322 | A1 * | 7/2017 | Ivri | B05B 17/0684 |
| 2020/0009571 | A1 * | 1/2020 | Du | B01L 3/502715 |
| 2020/0338552 | A1 * | 10/2020 | Scherr | B01L 3/502776 |
| 2021/0162742 | A1 * | 6/2021 | Muramatsu | B41J 2/04581 |
| 2022/0280933 | A1 * | 9/2022 | Bharadwaj | B01L 3/0268 |

FOREIGN PATENT DOCUMENTS

| | | | |
|---|---|---|---|
| EP | 3738671 | A1 | 11/2020 |
| WO | 01096019 | A1 | 12/2001 |
| WO | 2016133783 | A1 | 8/2016 |

* cited by examiner

DROPLET GENERATION METHOD, SYSTEM AND APPLICATION

RELATED APPLICATIONS

The instant application claims priority as a continuation application under 35 U.S.C. 111(2) from International Application No. PCT/CN2022/088669 filed on 24 Apr. 2022, which takes priority from Chinese Patent Application No. 202110705486.9 filed on 24 Jun. 2021; Chinese Patent Application No. 202111335117.1 filed on 11 Nov. 2021; and Chinese Patent Application No. 202111335113.3 filed on 11 Nov. 2021, all four documents which are included by reference as if fully-set forth herein.

TECHNICAL FIELD

The application belongs to the technical field of droplet generation, and specifically relates to a new droplet generation method, a system for the method, and the application of the droplet generation method and the droplet generation system in the fields such as clinical diagnosis, gene expression analysis, microorganism detection, etc.

BACKGROUND

Methods for preparing digital PCR droplets according to prior arts are mainly driving micro-channel to do periodic reciprocating motion in an oily liquid, so that the sample solution is subjected to the periodic shear force of the oily liquid at the outlet of the micro-channel and enters the oily liquid, realizing the generation of micro-droplets. The methods pose strict requirements on the inner diameter, thickness, taper, angle, etc. of the micro-channel, and have high processing cost. Meanwhile, there is necessity to improve the uniformity and stability of the prepared droplets.

SUMMARY

The present disclosure provides a novel droplet generation method adopting a droplet generation device and a droplet receiver, wherein, a first liquid is placed in the droplet receiver, the droplet generation device comprises a fluid passage, an accommodating cavity with a variable volume and a droplet generation tube having relatively distant first port and second port, wherein the first port communicates with the accommodating cavity, and the droplet generation method comprises following steps:

S1, transferring a second liquid into the droplet generation tube, wherein the second liquid is a liquid immiscible with the first liquid;

S2. inserting the droplet generation tube into the first liquid, and keeping the second port of the droplet generation tube being below the liquid surface of the first liquid;

S3, controlling the accommodating cavity to make its volume change periodically, and injecting a driving fluid into the fluid passage to drive the movement of the second liquid.

The present disclosure further provides another droplet generation method, the droplet generation method forming droplets by mixing a first liquid and a second liquid immiscible with the first liquid, characterized in that, the droplet generation method comprises the following steps:

providing a first cavity stored with the first liquid;

feeding the second liquid into the first liquid through a second cavity having a port for liquid in and out, wherein a third liquid immiscible with the second liquid is used to drive the second liquid to flow, and is applied with vibration, the first liquid is kept relatively stationary with the first cavity and the second cavity, and the first cavity is kept relatively stationary with the second cavity during the feeding of the second liquid, the second liquid being wrapped by the first liquid to obtain droplets, wherein the first liquid and the third liquid are continuous phases, and the second liquid is a dispersed phase.

The present disclosure further provides a novel droplet generation system comprising a droplet generation device and a droplet receiver, used for accommodating a first liquid and droplets, the droplet generation device comprises an accommodating cavity with a variable volume, a control mechanism for controlling periodical change of volume of the accommodating cavity, and a droplet generation tube having a first port and a second port that are relatively distant from each other, the first port of the droplet generation tube communicates with the accommodating cavity, the inner diameter of the second port of the droplet generation tube is greater than 0.1 mm, and the droplet generation device further comprises a fluid driving mechanism for introducing a driving fluid into the accommodating cavity.

The present disclosure further provides application of the droplet generation method, the droplet generation system or the droplet generation device in clinical diagnosis, gene expression analysis or microorganism detection.

The present disclosure provides a brand-new droplet generation technique, which breaks through the limitation that the existing nanoliter scale droplet generation technology must use micro-pipes below 0.1 mm, and can realize the preparation of small-volume uniform droplets with reduced cost.

DETAILED DESCRIPTION OF EXEMPLARY EMBODIMENTS

Figure 1:
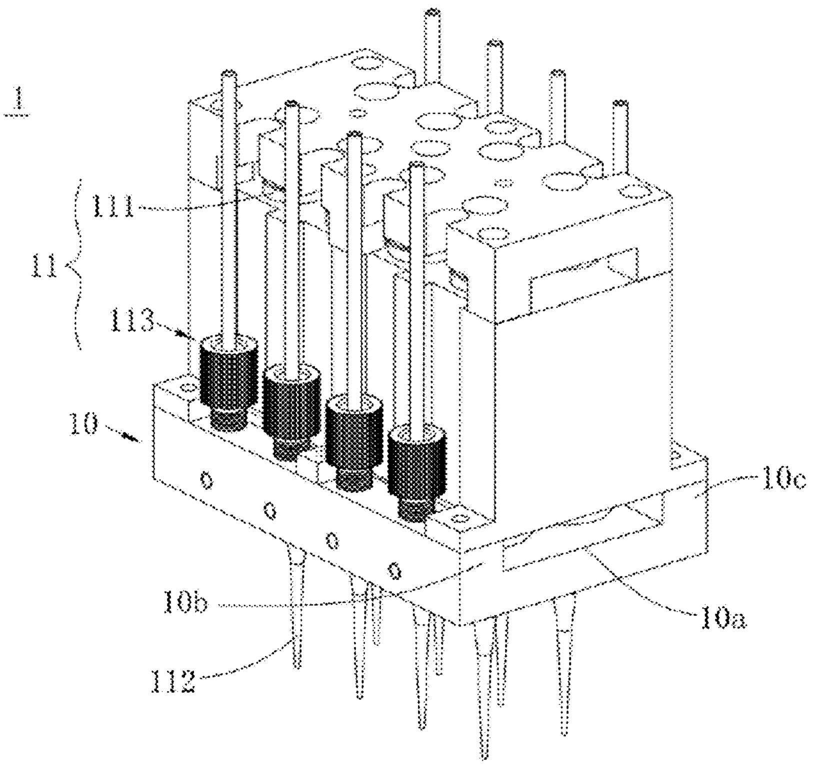
FIG. 1 is a schematic diagram of a droplet generation device according to some specific embodiments.

In present disclosure, it should be noted that the orientation or positional relationships indicated by terms “center”, “up”, “upper”, “lower”, “down”, “left”, “right”, “vertical”, “horizontal”, “inner”. “outer”, etc. are based on the orientation or positional relationship shown in the accompanying drawings, which is only for the convenience of describing the present disclosure and simplifying the description, rather than indicating or implying that the indicated device or element must have a specific orientation or be constructed and operate in a particular orientation, and therefore should not be construed as a limitation of the present disclosure. Furthermore, terms “first”, “second”, and “third” are used for descriptive purposes only and should not be construed to indicate or imply relative importance or order.

In present disclosure, it should be noted that terms “mount”, “mounting”, “connect” and “connecting” should be understood in a broad sense, unless otherwise expressly specified and limited, for example, it may be a fixed connection or a detachable connection, or integral connection; it may be a mechanical connection or an electrical connection; it may be a direct connection or an indirect connection through an intermediate medium, and it may be the internal communication of two elements. For those of ordinary skill in the art, the specific meanings of the above terms in the present disclosure can be understood according to specific situations.

It is generally acknowledged by the prior art that a relative smaller micro-channel for generating micro-droplets is advantageous, therefore, the inner diameter of the micro-channel actually used is usually smaller than 0.1 millimeter (mm). However, the inventors of the present disclosure have found in numerous experimental studies that the preparation of uniform droplets can be achieved simply by combining dispersed phase vibration and a micro-channel with appropriate inner diameters. Based on this discovery, the inventor further studied its mechanism, conducted a simulation structure analysis of the key influencing factors affecting droplet generation, and verified it through further experiments. Research shows that the droplet generation disclosed in the present disclosure has a completely new generation principle that is significantly different from any droplet generation method in the prior art. Compared with the existing droplet generation method, the droplet generation method of the present disclosure can achieve a non-microfluidic scale structure in a true sense (the geometric scale of all the cavities and consumables related to the generation process disclosed in this disclosure are above 0.1 mm scale; generally speaking, 0.1 mm is a critical dimension to distinguish microfluidics) to generate micro-droplets of nanoliter volume. By contrast, the structure scale actually used by the droplet generation technology in the fields of digital PCR, single cell sorting, etc. in the prior art is smaller than or close to 0.1 mm, the diameter of nanoliter droplets. Using this droplet generation technology, nano-scale droplets can be generated with structures much larger than the size of nano-droplets, which is a core technological breakthrough for lowering cost of preparing droplet digital PCR. Based on this droplet generation technology, even general pipette tips can be directly used as key generation consumables. In some embodiments, the droplet generation technology has no other mechanical movements except the micro-movement of the dispersed phase, and as such may be called as non-vibrational ejection. This technology for generating droplets realizes the control of nanoliter precision by destabilizing a dispersed phase using the velocity gradient in a droplet generation tube.

According to some embodiments of present disclosure, in step S3, droplets are formed in the droplet generation tube, and then flow out through the second port and enter the droplet receiver. This is quite unique compared to prior art where droplets are always formed outside the microchannel.

According to some embodiments of present disclosure, in step S3, the droplet generation tube and the droplet receiver remain relatively stationary. The periodic change is a compression-recovery reciprocating change, or an expansion-recovery reciprocating change, or a compression-recovery-expansion-recovery reciprocating change. The accommodating cavity, the droplet generation tube, and the droplet receiver are preferably arranged in sequence from top to bottom, the first port of the droplet generation tube is communicated with the bottom of the accommodating cavity, and a center line of the accommodating cavity, an axial line of the droplet generation tube, a center line of the first port, and a center line of the second port are coincident and extend in a vertical direction.

Further, the inner diameter of the second port is preferably not smaller than 0.1 mm, preferably greater than 0.2 mm, more preferably 0.2 to 1 mm, still more preferably 0.3 mm to 1 mm, particularly preferably 0.3 mm to 0.6 mm. Preferably, the inner diameter of the first port is larger than the inner diameter of the second port. Preferably, the droplet generation tube comprises a tapered tube portion, and two ends of the tapered tube portion respectively form the first port and the second port, the taper of the tapered tube portion is 0.05 to 0.2.

According to the present disclosure, the frequency of the periodic change may be 10 Hz to 1 KHz, preferably 50 Hz to 600 Hz, further preferably 80 Hz to 600 Hz, more preferably 100 Hz to 600 Hz, more preferably 150 Hz to 600 Hz, still more preferably 150 Hz to 500 Hz, particularly preferably 150 Hz to 300 Hz.

According to some specific examples, at least a part of the wall constituting the accommodating cavity is a movable part, which may be driven to move outward or inward when an external force is applied, thereby increasing or decreasing the volume of the accommodating cavity.

Preferably, the movable part is composed of a metal or non-metal diaphragm; and/or, one or more of the top or the surrounding side walls of the accommodating cavity are provided with the movable part.

According to some embodiments, the movable part is connected with a vibration mechanism through a connecting mechanism, and in step S3, the vibration mechanism drives the movable part to vibrate reciprocally and synchronously to control the volume of the accommodating cavity to change periodically.

According to some other embodiments, a vibrating mechanism is set abut against the movable part, and in step S3, the vibrating mechanism transmit its reciprocating vibration to the movable part to make it vibrate, so as to control the volume of the accommodating cavity to change periodically.

Preferably, a direction of the reciprocating vibration is an up-down direction.

According to the present disclosure, the vibration amplitude is 5 μm to 1000 μm, preferably 5 prn to 600 μm, more preferably 5 μm to 300 μm, further preferably 5 μm to 100 μm, more further preferably 5 μm to 60 μm.

Preferably, when the taper of the tapered tube portion is 0.05 to 0.1, setting the vibration frequency to be 100 Hz to 600 Hz, and the vibration amplitude to be 10 μm to 300 μm; when the taper of the tapered tube portion is 0.1 to 0.2, setting the vibration frequency to be 100 to 300 Hz, and the vibration amplitude to be 10 μm to 600 μm.

Preferably, in step S3, the fluid is a liquid, and the injection speed is 2 to 200 μL/min, preferably 10 to 50 μL/min.

According to some embodiments, the accommodating cavity is an annular cavity with an inner diameter of 4 to 6 mm; and/or, an inner peripheral side wall of the accommodating cavity extends in a vertical direction.

According to the present disclosure, the step S1 is performed before the step S2, or the step S1 is performed after the step S2.

Preferably, in step S1, the second liquid is sucked into the droplet generation tube through the second port of the droplet generation tube, which is followed or not followed by sucking some of the first liquid.

According to some embodiments, before step S3, the liquid in the droplet generation tube has a section of driving fluid and a section of second liquid in sequence from top to bottom.

According to some other embodiments, the liquid in the droplet generation tube has a section of driving fluid, a section of second liquid and a section of first liquid in sequence from top to bottom.

Preferably, the droplet generation method further comprises a step of cleaning and/or eliminating bubbles of the accommodating cavity and the droplet generation tube after the droplet generation is completed or before the next droplet generation starts.

Further preferably, two plunger pumps are adopted with different volumes to control the driving fluid, combining with a three-way valve for switching control, wherein the plunger pump with a larger volume is used in the step of cleaning and/or step of eliminating bubbles, and the plunger pump with a smaller volume is used in the step of droplet formation.

According to some embodiments, the first liquid is a continuous phase, and the second liquid is a dispersed phase; and/or, the first liquid is an oil phase, and the second liquid is an aqueous phase.

Preferably, the first liquid is added with a surfactant; the second liquid is an aqueous phase containing biological or chemical substances to be detected.

Preferably, the droplets are digital PCR droplets or single-cell droplets.

Generally, a diameter of the droplets is 50 μm to 250 μm, preferably 200 un or less, more preferably 150 μm or less, further preferably 120 μm or less, still more preferably 110 μm or less.

According to another embodiment, there is provided a droplet generation method, the droplet generation method forming droplets by mixing a first liquid and a second liquid immiscible with the first liquid, characterized in that, the droplet generation method comprises the following steps:

providing a first cavity stored with the first liquid;

feeding the second liquid into the first liquid through a second cavity having a port for liquid in and out, wherein a third liquid immiscible with the second liquid is used to drive the second liquid to flow, and is applied with vibration, the first liquid is kept relatively stationary with the first cavity and the second cavity, and the first cavity is kept relatively stationary with the second cavity during the feeding of the second liquid, the second liquid being wrapped by the first liquid to obtain droplets, wherein the first liquid and the third liquid are continuous phases, and the second liquid is a dispersed phase.

Further, the inner diameter of the port for liquid in and out of the second cavity is 0.1 to 1 mm; preferably, the inner diameter of the port for liquid in and out of the second cavity is 0.3 to 0.6 mm; and/or, a feed speed of the second liquid is 2 to 200 μL/min; preferably, a feed speed of the second liquid is 10 to 50 μL/min; and/or, a frequency of the vibration is 10 Hz to 1 KHz: and/or, an amplitude of the vibration is 5 to 1000 μm; preferably, a frequency of the vibration is 150 Hz to 600 Hz; an amplitude of the vibration is 5 to 100 μm.

Further, the first liquid and the third liquid are oil phases, and the first liquid is added with a surfactant: the second liquid is an aqueous phase containing biological or chemical substances to be detected.

Preferably, the center line of the port for liquid in and out and the liquid surface of the first liquid are perpendicular.

Preferably, when feeding the second liquid into the first liquid, inserting the port for liquid in and out of the second cavity below the liquid surface of the first liquid; and, firstly filling the second cavity with the third liquid, then sucking the second liquid through the port for liquid in and out of the second cavity to the second cavity which has already been stored with the third liquid, and finally driving the third liquid, so as to drive the second liquid to output from the port for liquid in and out of the second cavity.

According to some embodiments, there are provided a droplet generation system, comprising a droplet generation device and a droplet receiver, used for accommodating a first liquid and droplets, the droplet generation device comprises an accommodating cavity with a variable volume, a control mechanism for controlling periodical change of volume of the accommodating cavity, and a droplet generation tube having a first port and a second port that are relatively distant from each other, the first port of the droplet generation tube communicates with the accommodating cavity, the inner diameter of the second port of the droplet generation tube is greater than 0.1 mm, and the droplet generation device further comprises a fluid driving mechanism for introducing a driving fluid into the accommodating cavity.

Preferably, the inner diameter of the second port of the droplet generation tube is greater than 0.2 mm and lower than 1 mm.

Preferably, the inner diameter of the first port is greater than that of the second port; and/or, a volume of the droplet generation tube is 10 to 200 μL.

Preferably, the droplet generation tube comprises a tapered tube portion having a relatively distant first port and a second port, the inner diameter of the first port is larger than the inner diameter of the second port, and the taper of the tapered tube portion is 0.05 to 0.2. Preferably, the taper is 0.05 to 0.15. More preferably, the taper is lower than 0.12. Preferably, volume of the tapered tube portion is 10 to 200 μL.

Further, the periodic change is a compression-recovery reciprocating change, or an expansion-recovery reciprocating change, or a compression-recovery-expansion-recovery reciprocating change.

According to some embodiments, the fluid driving mechanism comprises a pump and a fluid passage, the droplet generation device comprises a base, which provides a cylindrical hole, the fluid passage, and a connecting portion for connecting the droplet generation tube, and there are one or more cylindrical holes, one or more fluid passages, and one or more connecting portions for one base, each of the cylindrical hole is cylindrical with both up opening and down opening, and is covered with a diaphragm, which form the accommodating cavity together with the cylindrical hole.

According to more specific embodiments, the accommodating cavity, the droplet generation tube, and the droplet receiver are arranged in sequence from top to bottom, the first port of the droplet generation tube communicates with the down opening of the accommodating cavity, a center line of the accommodating cavity, an axial line of the droplet generation tube, a center line of the first port, and a center line of the second port coincide and extend in a vertical direction.

Further, each diaphragm comprises a main body and a movable part, the main body is fixedly connected with the base, the movable part is located over the cylindrical hole, and is connected to the control mechanism through the connecting member.

According to the present disclosure, the diaphragm may be a metal or non-metal diaphragm; a thickness of the diaphragm is 0.005 to 2 mm. Preferably, a sealing member is provided between the diaphragm and the base to seal the accommodating cavity.

Preferably, the control mechanism is a vibration mechanism. The vibration mechanism further comprises one or more of a galvanometer motor, piezoelectric ceramic, and a voice coil motor; and/or, direction of vibration provided by the vibration mechanism is an up-down direction.

Preferably, the droplet generation tube is detachably connected to the connecting portion. Preferably, a number of the cylindrical holes, the fluid passages, and the connecting portions for one base is 2 to 20, respectively.

According to more specific embodiments, there are a plurality of cylindrical holes, a plurality of fluid passages, and a plurality of connecting portions, two opposite side portions of the base are respectively higher than a middle part between the two opposite side portions, the plurality of cylindrical holes are independently distributed in the middle part of the base and are arranged in two rows, each fluid passage comprises a vertical passage formed on two opposite side portions of the base and a horizontal passage correspondingly communicating the vertical passage with the cylindrical hole.

Preferably, a drainage portion is formed between a port of the horizontal passage and an inner peripheral side wall of the accommodating cavity, so that the liquid from the horizontal passage enters the accommodating cavity in a direction tangent to the circumferential direction of the accommodating cavity.

According to some specific embodiments, one end portion of the fluid passage communicates with the accommodating cavity, and when the fluid is driven from the fluid passage into the accommodating cavity, the fluid forms a vortex in the accommodating cavity and the droplet generation tube that rotates along the circumferential directions of the accommodating cavity and the droplet generation tube.

According to some other specific embodiments, one end portion of the fluid passage communicates with the accommodating cavity, the direction in which the fluid is discharged from the fluid passage is deviated from an axial line of the accommodating cavity.

According to another embodiment, there is provided with a droplet generation system, which comprises:

a container having a first cavity for placing the first liquid, the container having a mouth communicating with the first cavity;

a sample-adding tube having a second cavity, which is provided with a port for liquid in and out, a liquid injection port and a vibration access port which are respectively communicated with the second cavity, the inner diameter of the port for liquid in and out is 0.1 to 1 mm, the port for liquid in and out is used for sucking the second liquid and the third liquid and outputting the second liquid, the liquid injection port is used for connecting to a drive source, and the vibration access port is used to connect to a vibration source;

a drive source connected to the liquid injection port:

and a vibration source applying vibration to the vibration access port.

Preferably, an inner diameter of the port for liquid in and out of the second cavity is 0.3 to 0.6 mm; and/or, the droplet generation system is a digital PCR droplet generation system or a single-cell droplet generation system.

More specifically, the sample-adding tube has a first tube cavity, a second tube cavity and a third tube cavity, which together form the second cavity.

In one embodiment, the first tube cavity extends along a first direction, one end of which forms the liquid injection port, and another end of which is communicated with the second tube cavity; the second tube cavity is provided with the vibration access port; the third tube cavity extends along a second direction, one end of which is communicated with the second tube cavity, and another end of which forms the port for liquid in and out, wherein the first direction and the second direction are perpendicular;

Preferably, the second cavity is narrowed near the port for liquid in and out; a diaphragm is encapsulated at the vibration access port, and the vibration source applies vibration to the diaphragm:

Preferably, center lines of the port for liquid in and out and the vibration access port coincide.

Figure 17:
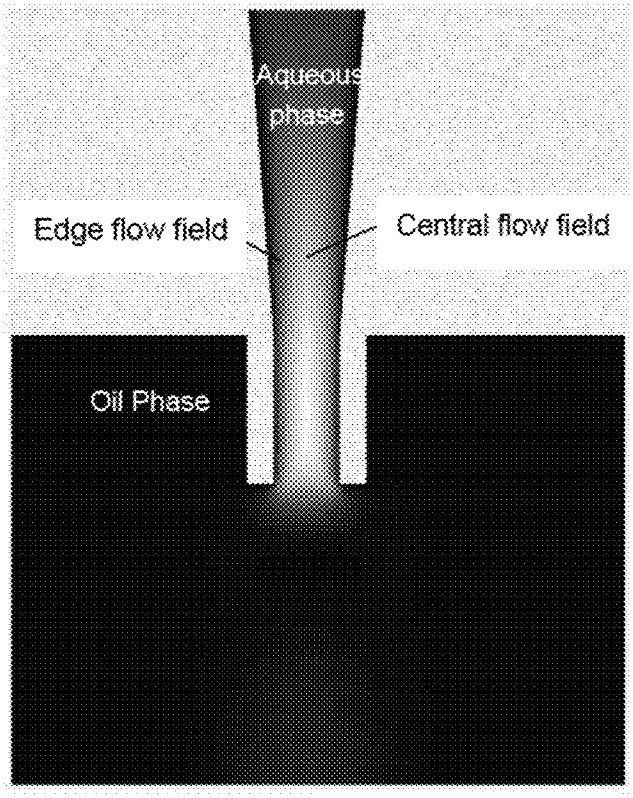
FIG. 17 is a schematic diagram showing distribution of velocity field near an outlet of a droplet generation tube.

According to some aspects of the present disclosure, the droplet generation principle is described as follows:

A driving mechanism (such as a vibration mechanism) pushes and pulls a movable part through direct connection with the movable part (such as an elastic diaphragm), or touches the movable part through contact with the movable part, so that the movable part vibrates periodically and drives a liquid (a second liquid/dispersed phase/water phase) in an accommodating cavity to produce periodic motion. At the same time, a driving fluid (a driving oil) is continuously injected into the cavity, then at an oil-water interface (an interface between a first liquid and the second liquid) at the outlet (a second port) of the droplet generation tube, a periodic motion comprising forward ejection stage and back retraction stage is generated. During the forward ejection stage, according to the characteristics of the tubular fluid, it can be seen from the Poiseuille flow that the flow velocity in the middle of the tube will be greater than the flow velocity near the wall (as shown in FIG. 17, the velocity field distribution at the outlet of the droplet generation tube is shown, wherein the brightness indicates level of the velocity, it can be seen that the velocity at the center of the outlet is the largest, which will stretch the oil-water interface), causing the moving velocity of the intermediate interface to be greater than that of the interface close to the wall, resulting in the formation of a conical interface at the oil-water interface, which is continuously be elongated, and since the surface tension at the oil-water interface has a shrinkage tendency—a tendency to cut the interface into droplets, when the stretched interface becomes gradually slender, according to Laplace's equation, the interfacial tension gradually increases, and the interface can be cut off when it exceeds a certain critical value, resulting in the phenomenon of Rayleigh-Taylor instability, and accordingly the formation of droplets. This is also the key reason why the droplets can be generated even when the outlet of the droplet generation tube is much larger than the diameter of the micro-droplet (about 0.1 mm). The subsequent back retraction will pull back the conical interface to complete a cyclic motion. Further, it is found that the exact location of droplet generation is within the droplet generation tube (in some specific experiments, the droplet was generated at about 0.5 mm from the outlet), unlike other generation techniques where droplets are formed outside the tube outlet.

The non-vibrational ejection technology has obvious advantages compared to the droplet generation method that uses micro-channels to vibrate continuously at high frequency in oily liquids. On the one hand, there is no strict requirement for the depth of the micro-channel extending into the oil phase liquid, and it will not cause damage to the droplets that have been generated, and the quality of droplets and the operation of generation are more controllable in the overall generation process. On the other hand, the requirements for the inner diameter of the micro-channel in the prior art are all within 0.1 mm, the larger the inner diameter, the higher the high-frequency swing frequency required to be applied, the higher the control requirements, and the poorer the stability, and at the same time, the higher the requirements for the consistency of the micro-channel itself during manufacturing. The present disclosure realizes the generation of droplets by applying vibration to the aqueous liquid, and reduces the requirement for the inner diameter of the port for liquid in and out of the micro-channel (which may be greater than 0.1 mm, preferably more than 0.3 mm), which can ensure the uniformity of the droplets, make the control easier, and reduces the processing difficulty of the sample-adding tube, and reduces the processing cost. Compared with other methods like co-current focusing method, it is advantageous with simpler system, more convenient operation and lower cost.

The technical solutions of the present disclosure are explained clearly and completely below in conjunction with the accompanying drawings, and apparently, the described embodiments are merely a part of the embodiments of the present disclosure, not all the embodiments. Based on the embodiments of the present disclosure, all other embodiments obtained by one of ordinary skill in the art without creative work also fall within the protective scope of the present disclosure.

Refer to FIGS. 1 to 9, the droplet generation system comprises a droplet generation device 1 and a droplet receiver 2. The droplet generation device 1 comprises a base 10 and a plurality of droplet generation units 11 arranged in parallel on the base 10, which can achieve single-channel or multiple-channel generation of droplets at the same time.

Figure 2:
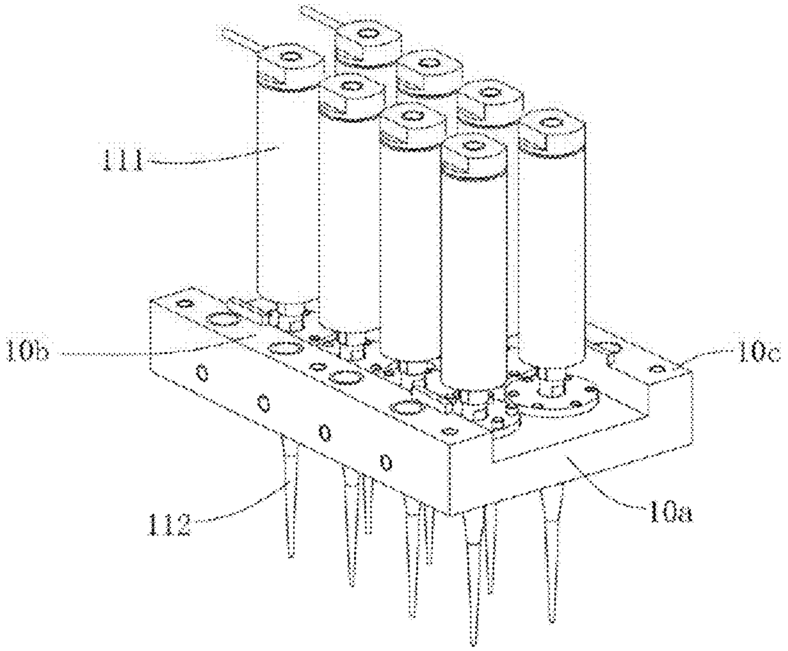
FIG. 2 is a partial schematic diagram of FIG. 1.

Refer to FIG. 2, the base 10 is an aluminum block and has an elongated shape, wherein, middle of the aluminum block concaves downward from the surface to form a middle part 10*a*, a left raised edge part 10*b* and a right raised edge part 10*c*. The plurality of droplet generation units 11 are arranged side by side and evenly spaced along the length direction of the base 10.

Figure 3:
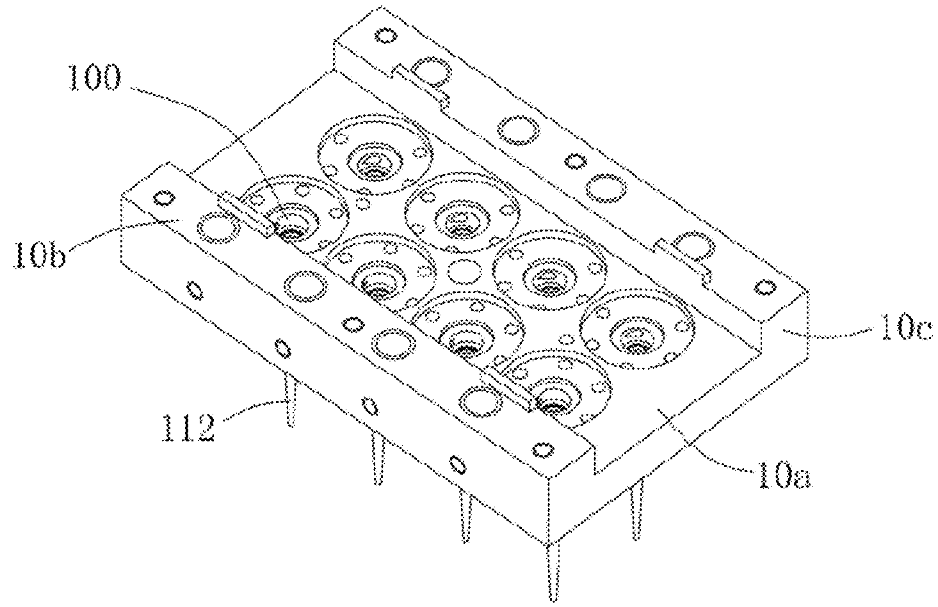
FIG. 3 is a partial schematic diagram of FIG. 2.
Figure 4:
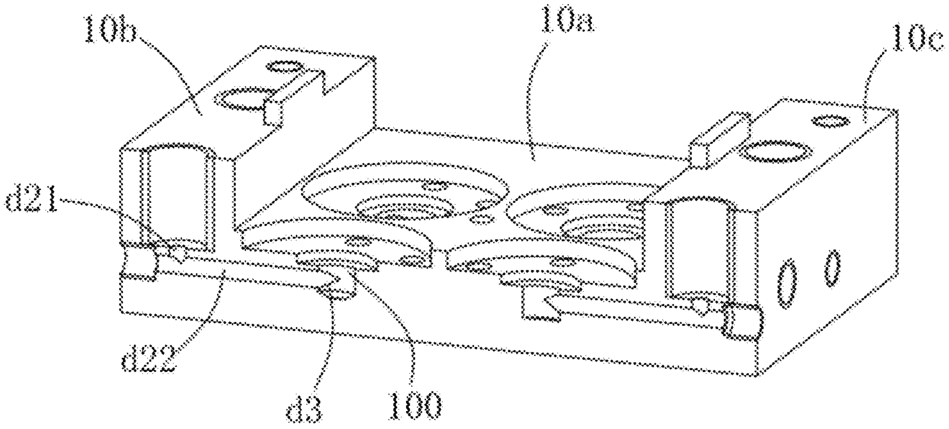
FIG. 4 is a schematic sectional view of FIG. 3.
Figure 5:
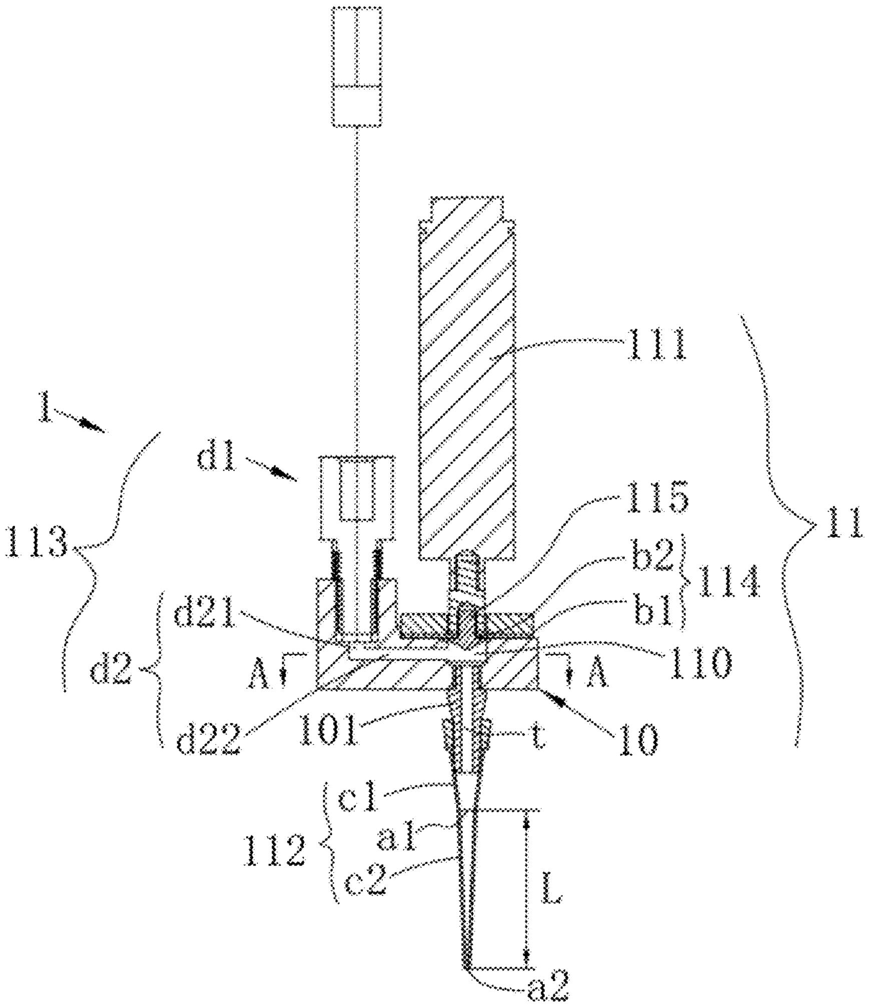
FIG. 5 is a schematic sectional view of a single droplet generation unit of the droplet generation device according to some embodiments.
Figure 6:
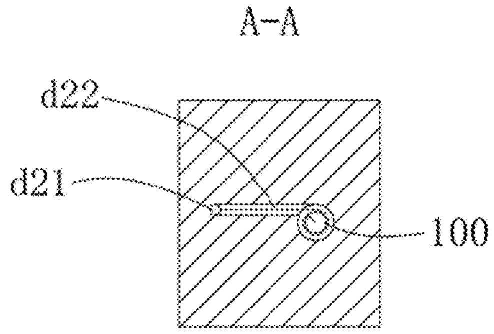
FIG. 6 is a schematic sectional diagram along A-A direction in FIG. 5.

Refer to FIGS. 3, 4 and 5, the middle part 10*a* of the base 10 is provided with cylindrical holes 100 extending up and down, and connecting portions 101 correspondingly provided below each cylindrical hole 100. The cylindrical holes 100 are in two rows, wherein each row has four evenly spaced cylindrical holes 100, and the two rows of cylindrical holes 100 respectively are arranged in alignment with each other.

As shown in FIG. 5, each droplet generation unit 11 comprises an accommodating cavity 110 with a variable volume, a control mechanism 111 for controlling the volume of the accommodating cavity 110 to change periodically, a droplet generation tube 112 having relatively distant first port a1 and second port a2, and a fluid driving mechanism 113 for introducing a driving fluid into the accommodating cavity 110.

Further, each cylindrical hole 100 is covered with a diaphragm 114, and the cylindrical hole 100 and the corresponding diaphragm 114 together form the accommodating cavity 110. The control mechanism 111 is a vibration mechanism, and is mounted above the cylindrical hole 100 and connected with the diaphragm 114 through a connecting member 115, so as to control the motion of the diaphragm 114 to implement the volume change of the accommodating cavity 110. The droplet generation tube 112 is set vertically, wherein the upper end portion communicates with the connecting portion 101, and the lower end portion forms a droplet outlet.

A center line of the accommodating cavity 110, an axial line of the droplet generation tube 112, a center line of the first port a1, and a center line of the second port a2 coincide and extend in a vertical direction. The accommodating cavity 110 is annular with an inner diameter of about 5 mm and an inner peripheral side wall extending in a vertical direction. The diaphragm 114 (of stainless steel material) constituting the top of the accommodating cavity 110 comprises a main body b1 and a movable part b2, wherein the main body b1 is fixedly connected with the base 10, the movable part b2 is located over the cylindrical hole 100, and is connected to the control mechanism 111 through a connecting member 115. The control mechanism 111 specifically comprises piezoelectric ceramics, which can provide up-and-down reciprocating vibration. When the reciprocating vibration is performed, the movable part b2 will be driven to move inward or outward relative to the accommodating cavity 110, thereby periodically changing the volume of the accommodating cavity 110. Accordingly, the liquid in the accommodating cavity 110 is disturbed by the periodic volume change. The periodic change may be a compression-recovery reciprocating change, or an expansion-recovery reciprocating change, or a compression-recovery-expansion-recovery reciprocating change. In one embodiment, at least the periodic change that is provided comprises a compression-recovery reciprocating change. Further, the piezoelectric ceramics is 40VS12 (with internal threads that dock the connecting member 115).

The droplet generation tube 112 comprises a connecting tube portion c1 and a tapered tube portion c2. The tapered tube portion c2 has the first port a1 and the second port a2. The inner diameter of the tapered tube portion c2 gradually decreases from the first port a1 to the second port a2, and the taper presented by the change of the inner diameter has an important influence on the generation effect of droplets. Let the inner diameter of the first port a1 be $R_1$, the inner diameter of the second port a2 be $R_2$, and the distance between the first port a1 and the second port a2 (that is, the length of the tapered tube portion c2) be L, then the taper is $(R_1-R_2)/L$. In one embodiment, the taper of the tapered tube portion c2 is 0.12, and the inner diameter $R_2$ of the second port a2 is 0.5±0.1 mm. The volume of the droplet generation tube 112 is about 10 microliters (μL).

The connecting tube portion c1 and the tapered tube portion c2 intersect at the first port a1, which is used to be detachably sleeved on the connecting portion 101, and its taper is not particularly required, but preferably larger than that of the tapered tube portion c2. A flow channel t communicated with the accommodating cavity 110 is formed in the middle of the connecting portion 101. After the droplet generation tube 112 is mounted to the connecting portion 101, the accommodating cavity 110 communicates with the droplet generation tube 112 through the flow channel t.

The fluid driving mechanism 113 comprises a pump d1 and a fluid passage d2, wherein the fluid passage d2 comprises a vertical passage d21 formed on the left raised edge part **10*b* of the base 10 and a horizontal passage d22 correspondingly communicating the vertical passage d21 to the cylindrical hole 100. To help remove air bubbles in the cavity, a drainage portion d3 is formed between the port of the horizontal passage d22 and the inner peripheral side wall of the accommodating cavity 110, so that the liquid from the horizontal passage d2 enters the accommodating cavity 110 tangentially to the circumference of the accommodating cavity 110, thus, the fluid forms a vortex in the accommodating cavity 110 and the droplet generation tube 112 that rotates along the circumferential directions of the accommodating cavity 110 and the droplet generation tube 112, so that air bubbles can be easily removed. In some other embodiments, the provision of the drainage portion is not necessary, as long as the direction in which the fluid is discharged from the fluid passage d2** is deviated from the axial line of the accommodating cavity, good effect of bubble removal will be achieved.

Further, two plunger pumps with different volumes are used to control the driving fluid, combined with a three-way valve for switching control, wherein the plunger pump with a larger volume is used in the cleaning and/or step of eliminating bubbles, and the plunger pump with a smaller volume is used in the droplet generation step.

Further, a sealing ring 116 is further provided between the diaphragm 114 and the base 10 to improve the sealing performance of the accommodating cavity.

Figure 7:
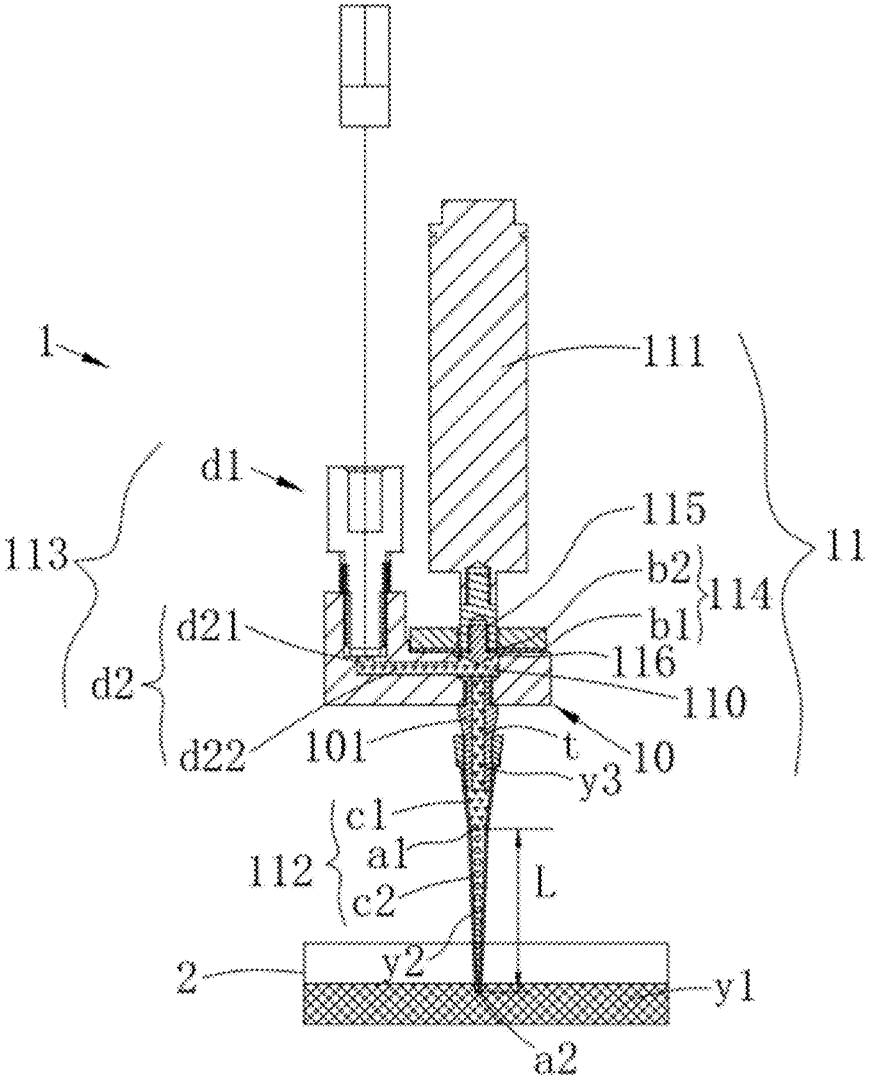
FIG. 7 is a schematic sectional diagram of a droplet generation system according to some embodiments.

As shown in FIG. 7, the droplet receiver 2 is located below the second port a2 and is used to receive a first liquid y1 and the droplets.

In the field of digital PCR, the first liquid y1 is usually a formula oil, such as mineral oil, to which a surfactant is preferably added. A second liquid y2 is usually an aqueous phase of the biological or chemical substance to be detected.

Figure 8:
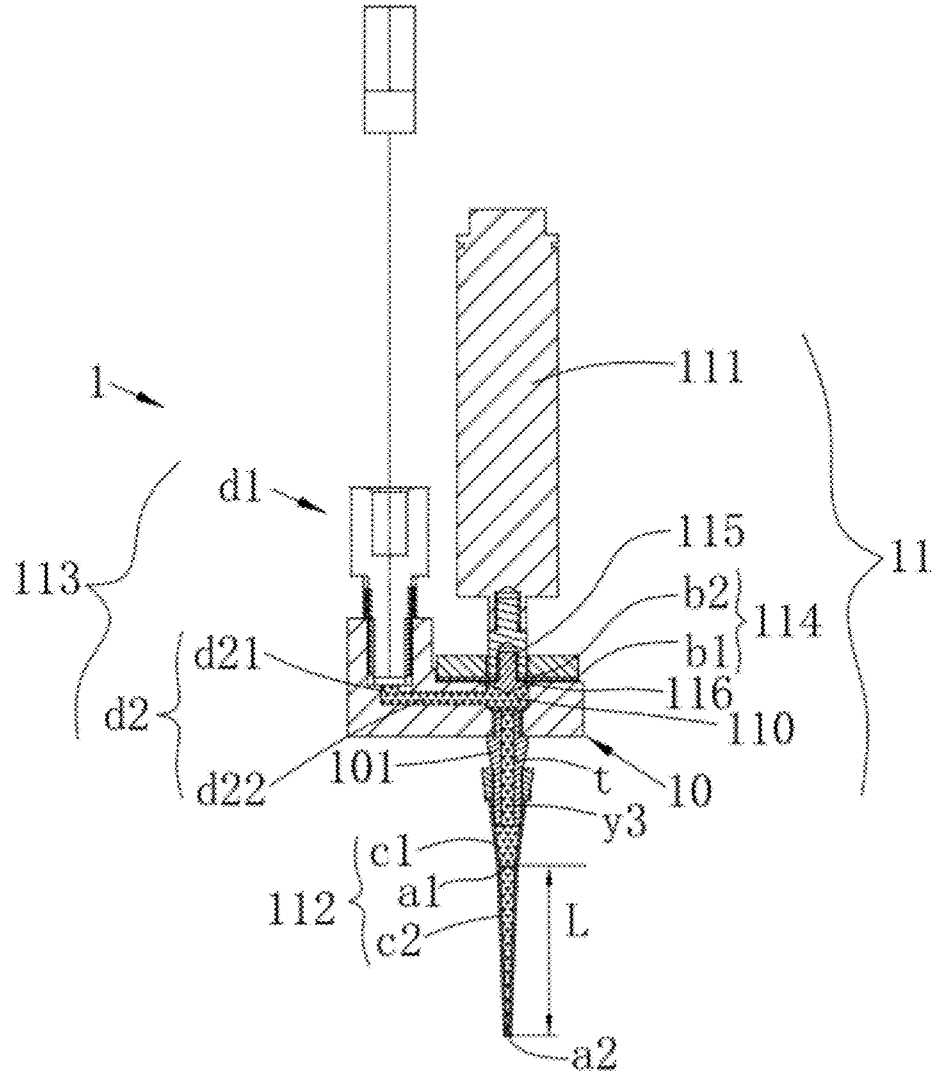
FIG. 8 is a schematic sectional view of a single droplet generation unit filled with driving oil according to some embodiments.

As shown in FIG. 8, a fluid y3 (a driving oil) fills the inner cavities of the fluid passage d2, the accommodating cavity 110 and the droplet generation tube 112. Further, the fluid y3 and the first liquid y1 may adopt the same mineral oil.

Figure 9:
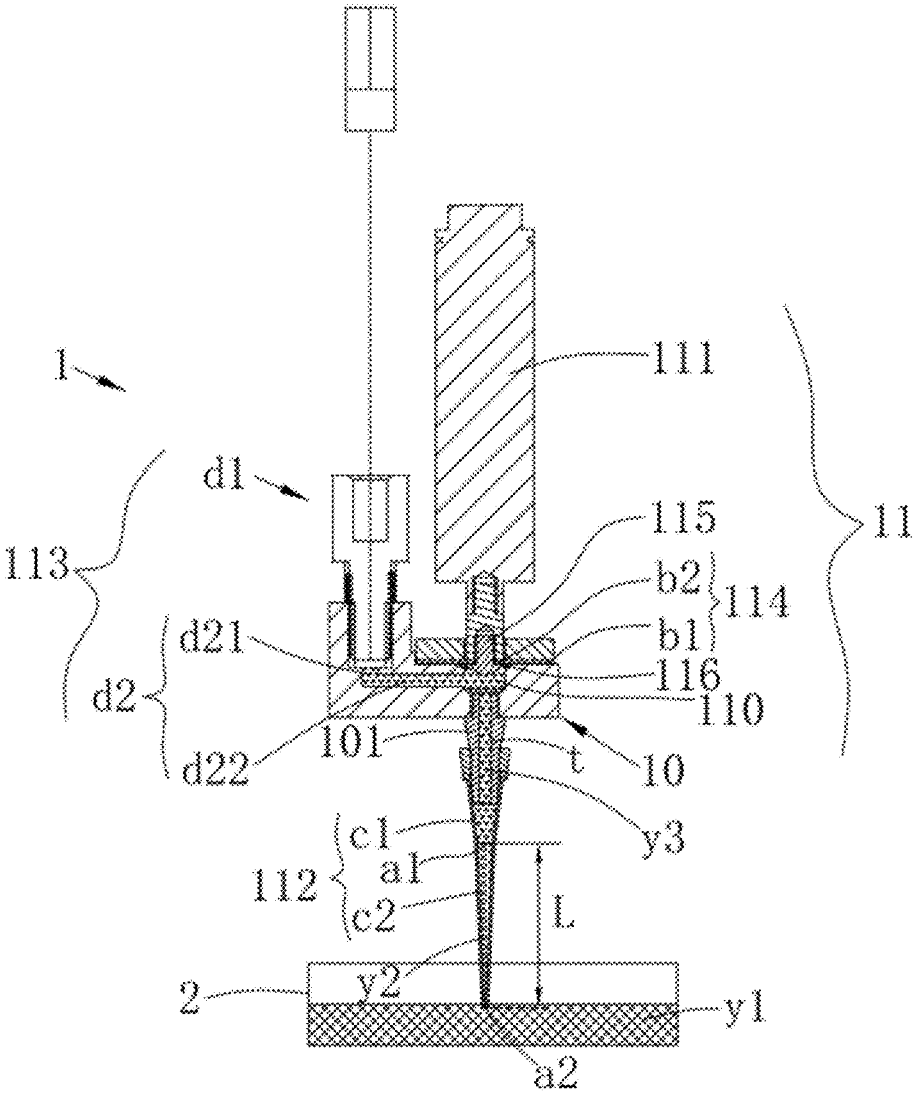
FIG. 9 is a schematic sectional view of a single droplet generation unit where a driving fluid segment and a second fluid segment is formed according to some other embodiments.

As shown in FIG. 9, generally, to generate droplets, the liquid in the droplet generation tube 112 has a section of driving fluid and a section of a second liquid in sequence from top to bottom. Alternatively, the liquid in the droplet generation tube 112 has a section of driving fluid, a section of second liquid and a section of first liquid in sequence from top to bottom. After that, the driving mechanism and the fluid driving mechanism are turned on to start generating droplets.

Figure 10:
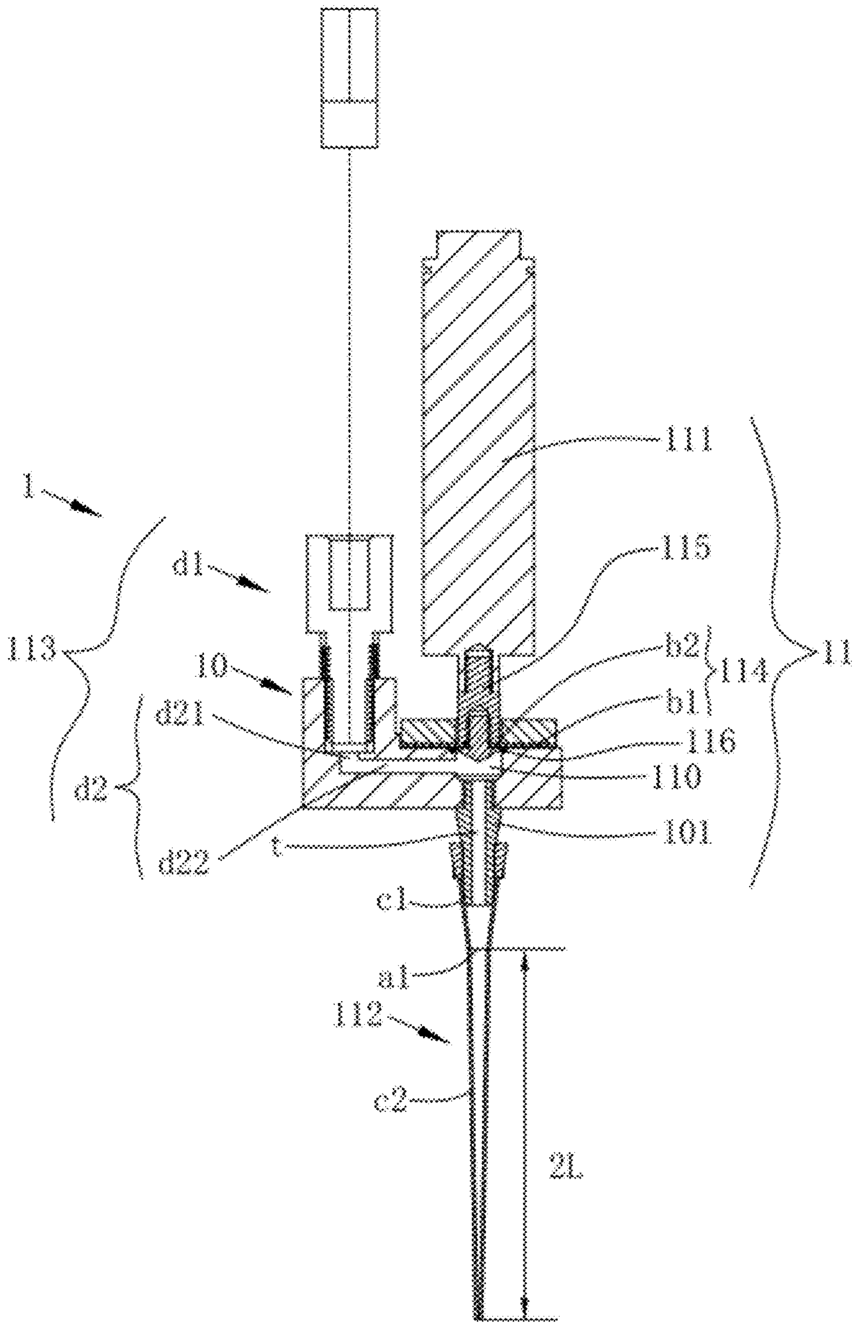
FIG. 10 is a schematic sectional diagram of a droplet generation system according to some other embodiments.

Refer to FIG. 10, it shows a droplet generation device in other embodiments which is substantially the same as that shown by FIG. 8, differing in that the length from the first port a1 to the second port a2 of the droplet generation tube is 2L. Accordingly, the taper corresponding to the tapered tube portion c2 of the droplet generation tube 112 is 0.06, that is, the taper of the tapered tube portion of the droplet generation tube 112 in these embodiments is half of the corresponding taper shown in FIG. 8.

A specific droplet generation method adopting the droplet generation system shown in FIG. 9 comprises following steps:

S1. Using the pump (a plunger pump) with a larger volume to fill the fluid passage, the accommodating cavity and the droplet generation tube with the fluid (a driving oil), then sucking the water phase to be detected (the second liquid) into the droplet generation tube through the second port, and then sucking a section of formula oil (the first liquid). In this way, the liquid in the liquid generation tube comprised three sections, which were the driving oil section, the water phase section, and the formula oil section from top to bottom;

S2. Inserting the droplet generation tube into the formula oil, so that the second port of the droplet generation tube was about 2 mm below the liquid surface of the formula oil:

S3. Using the vibration mechanism to directly push and pull the movable part of the diaphragm to reciprocally vibrate up and down synchronously, controlling the periodical change of volume of the accommodating cavity, and injecting the driving oil into the fluid passage to drive the movement of the water phase. At this time, droplets were generated in the tapered tube portion of the droplet generation tube, and then the formed droplets flowed out through the second port of the droplet generation tube and entered the droplet receiver. During this process, there was no need to drive the droplet generation tube to move, and the droplet generation tube and the droplet receiver remained relatively stationary.

Figure 11:
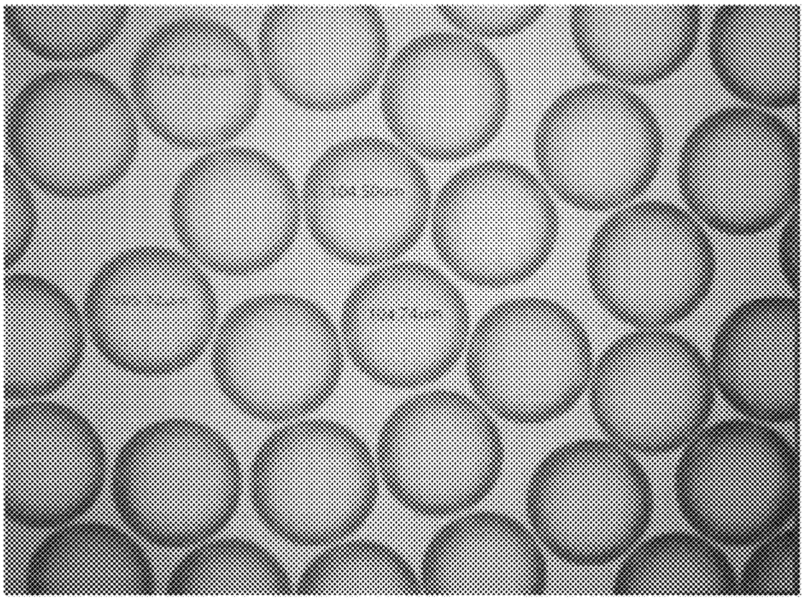
FIGS. 11 to 16 are microscope images of the droplets prepared in specific embodiments.
Figure 12:
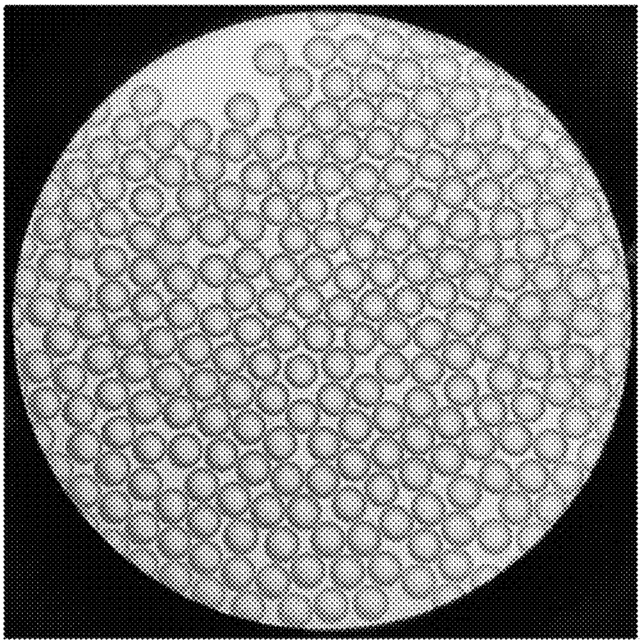
Figure 13A:
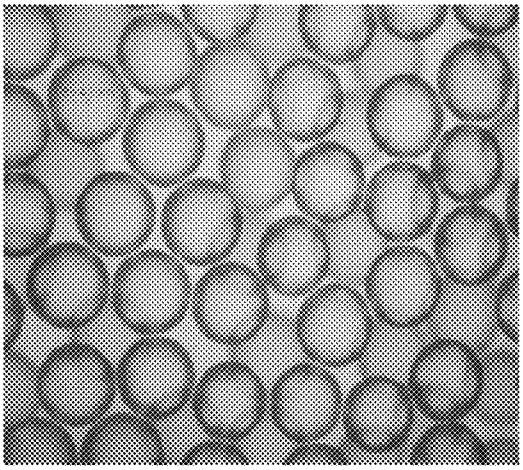
Figure 13B:
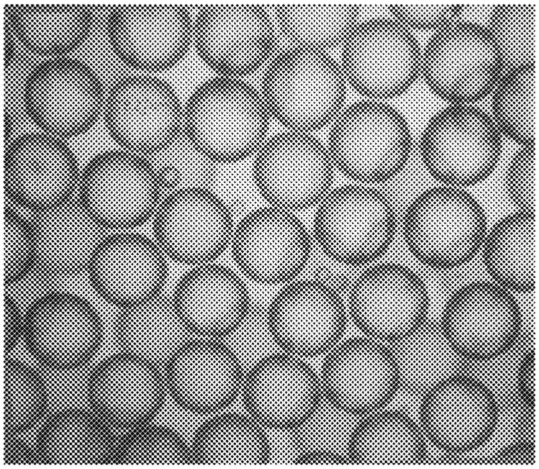

In one embodiment, according to above steps, water was used as the second liquid, and the droplets shown in FIG. 11 and FIG. 12 were prepared under the conditions that an injection speed of the driving oil was 36.5 μL/min, a vibration frequency of the piezoelectric ceramic was 150 Hz, a vibration amplitude was 50 micrometers (μm), and an input voltage was 2.5 V. It can be seen that droplets of uniform size were successfully prepared, and the diameter of the droplets was between 104 μm and 106 μm.

In another embodiment, the steps of the droplet generation method are basically the same as above, differing in that the injection speed of the driving oil is changed.

The droplets were prepared under the conditions that the injection speed of the driving oil was 19.5 μL/min, the vibration frequency of the piezoelectric ceramic was 150 Hz, the vibration amplitude was 50 μm, and the input voltage was 2.5 V. The diameter of the formed droplets was about 85±1 μm, as shown in FIG. **13*a***.

The droplets were also prepared under the conditions that the injection speed of the driving oil was 15.0 μL/min, the vibration frequency of the piezoelectric ceramic was 150 Hz, the vibration amplitude was 50 μm, and the input voltage was 2.5 V. The diameter of the formed droplets was about 78±1 μm, as shown in FIG. **13*b***.

Figure 14A:
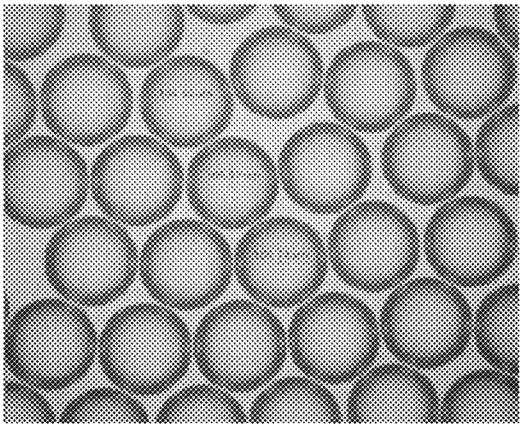

In some other embodiments, the droplets were prepared under the conditions that the injection speed of the driving oil was 48.7 μL/min, the vibration frequency of the piezo-electric ceramic was 200 Hz, the vibration amplitude was 50 μm, and the input voltage was 2.5 V. The diameter of the formed droplets was about 104.00 to 107.00 μm, as shown in FIG. 14*a*.

Figure 14B:
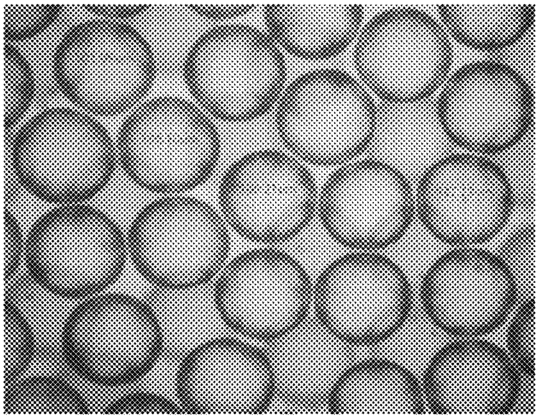

In some other embodiments, the droplets were prepared under the conditions that the injection speed of the driving oil was 60.8 μL/min, the vibration frequency of the piezo-electric ceramic was 250 Hz, the vibration amplitude was 50 μm, and the input voltage was 2.5 V. The diameter of the formed droplets was about 103.00 to 108.50 μm, as shown in FIG. 14*b*.

Figure 14C:
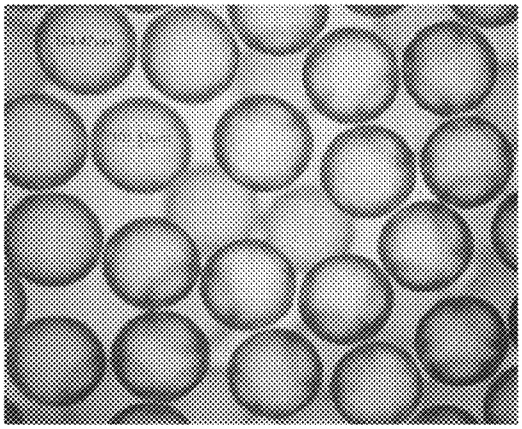
Figure 14D:
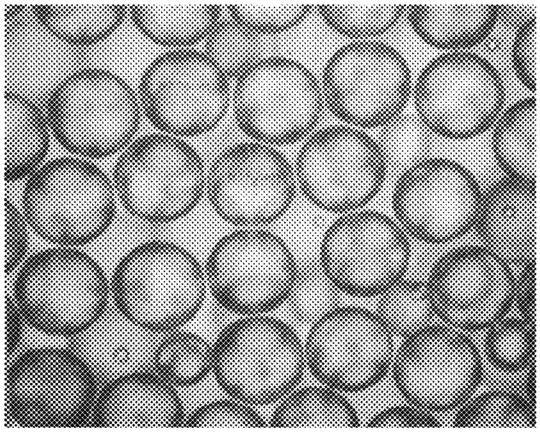

In some other embodiments, the droplets were prepared under the conditions that the injection speed of the driving oil was 73.0 μL/min, the vibration frequency of the piezo-electric ceramic was 300 Hz, the vibration amplitude was 50 μm, and the input voltage was 2.5 V. The diameter of the formed droplets was about 93.00 to 106.00 μm, as shown in FIG. 14*c* and FIG. 14*d*.

It can be seen that the droplet generation method of the present disclosure can obtain relatively uniform droplets at different frequencies.

In still some other embodiments, the droplet generation device shown in FIG. 10 was used, that is, a droplet generation tube with a smaller taper was used, and experiments were carried out at different vibration frequencies. The results show that uniform droplets can still be obtained when the vibration frequency of piezoelectric ceramics is 600 Hz. The effect is comparable to above embodiments where the vibration frequency of piezoelectric ceramics is 150 Hz.

Figure 15:
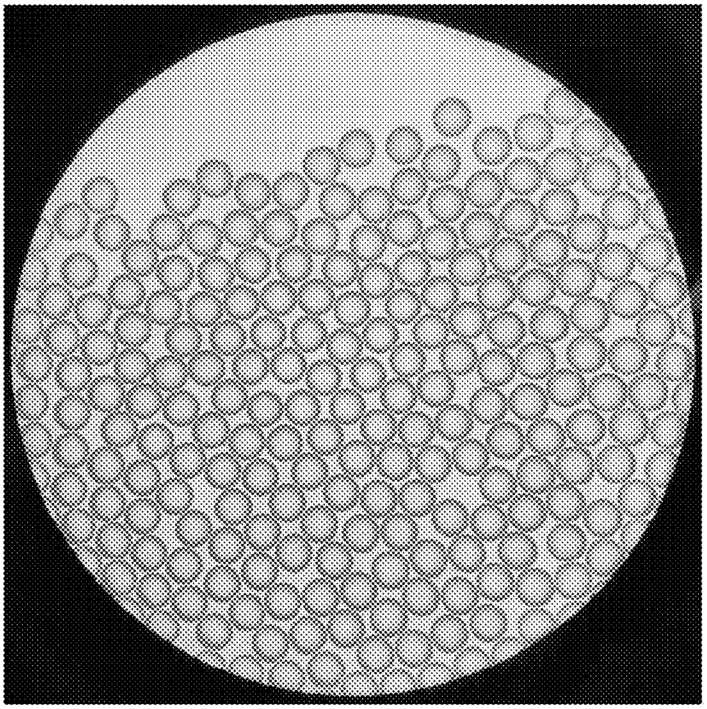
Figure 16:
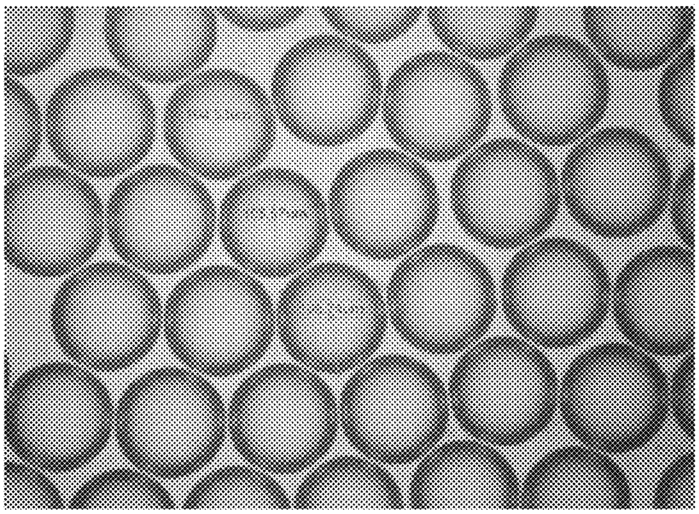

In further some embodiments, the droplet generation was performed using RCR reagent instead of water as the second liquid. The RCR reagent adopted a 20 μl system: 10 μl of Bio-Rad supermix, 1 μl of Bio-Rad demo kit DNA, 1 μl of fam probe, 1 μl of hex probe, and 7 μl of water. The prepared droplets are shown in FIG. 15 and FIG. 16. It can be seen that droplets of very uniform size were successfully prepared, and the diameter of the droplets was about 104 to 107 μm.

Figure 18:
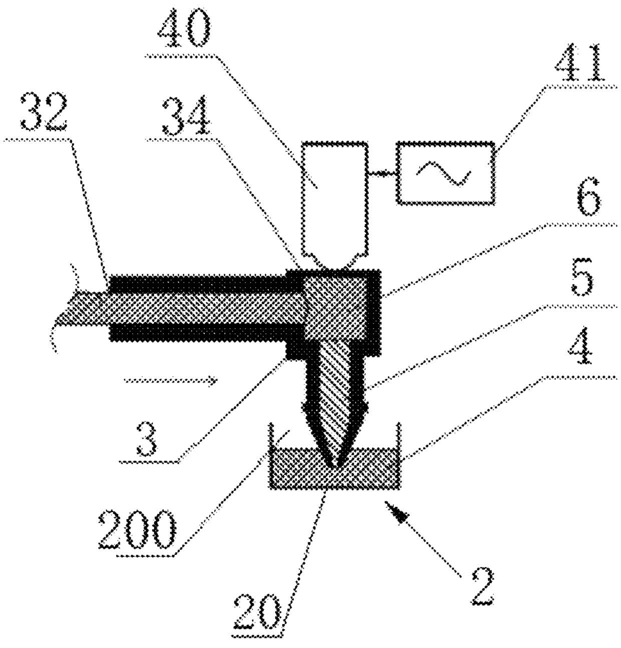
FIG. 18 is a schematic diagram illustrating droplet generation state of the droplet generation device according to some embodiments.
Figure 19:
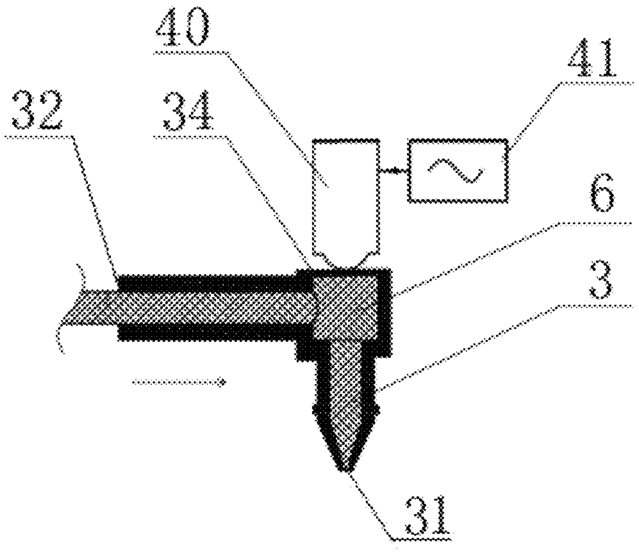
FIG. 19 is a schematic diagram illustrating a droplet generation device with its second cavity filled with a third liquid according to some embodiments.
Figure 20:
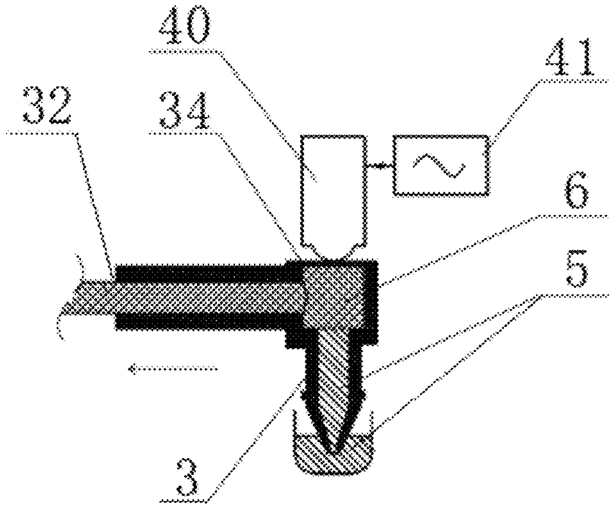
FIG. 20 is a schematic diagram illustrating a droplet generation device with its second cavity filled with a second liquid according to some embodiments.
Figure 21:
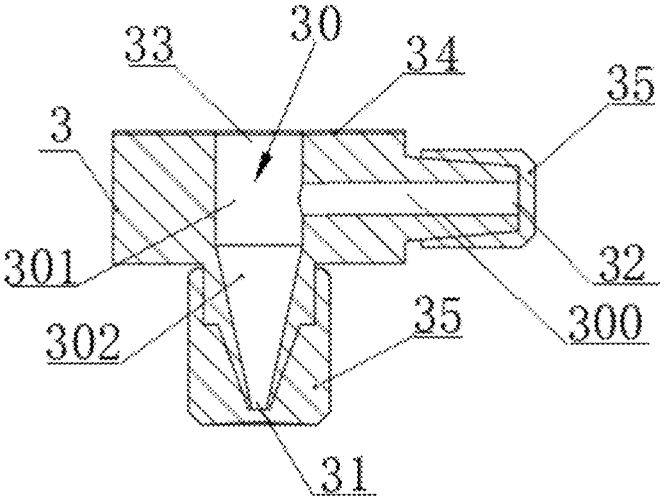
FIG. 21 is a schematic diagram of a single sample addition tube according to some embodiments.
Figure 22:
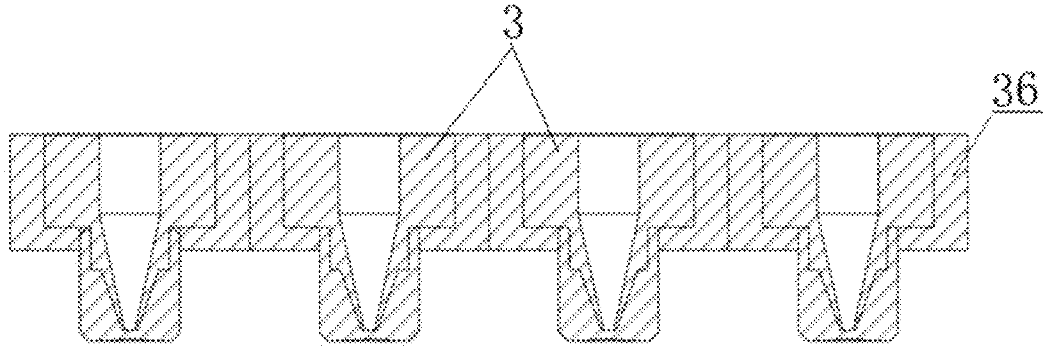
FIG. 22 is a schematic diagram of a sample-adding tube assembly according to some embodiments.

Referring to FIG. 18 to FIG. 20, another forms of droplet generation devices are shown, wherein, the droplet generation devices mainly comprise: a container 2, a sample-adding tube 3, a driving source and a vibration source.

The container 2 has a first cavity 20 for placing the first liquid 4, and a mouth 200 communicating with the first cavity 20. In some specific embodiments: the bottom and the periphery of the container 2 are closed, the mouth 200 is opened on the top of the container 2, and the generated droplets can be directly stored in the container 2, which is convenient to directly perform PCR heating cycle, amplification, and analysis, avoiding transfer and collection of the droplets.

The sample-adding tube 3 has a second cavity 30, and is provided with a port for liquid in and out 31, a liquid injection port 32 and a vibration access port 33 that are respectively communicated with the second cavity 30. The port for liquid in and out 31 is used for sucking the second liquid 5 and the third liquid 6 and outputting the second liquid 5, the liquid injection port 32 is used to connect to the drive source, and the vibration access port 333 is used to connect to the vibration source. The center lines of the port for liquid in and out 31 and the vibration access port 33 coincide. Since the vibration is input to the second liquid 5 and the third liquid 6 in the second cavity 30 through the vibration access port 33, the coincidence of the center lines of the port for liquid in and out 31 and the vibration access port 333 enables the shortest transmission distance and an easier control.

The sample-adding tube 3 has a first tube cavity 300, a second tube cavity 301 and a third tube cavity 302. The first tube cavity 300, the second tube cavity 301 and the third tube cavity 302 together form the second cavity 30, wherein:

The first tube cavity 300 extends along a first direction (the horizontal direction in the figure), one end of which forms the liquid injection port 32, and the other end is communicated with the second tube cavity 301 (the left end in the figure);

The second tube cavity 301 is provided with a vibration access port 33 (the upper end shown in the figure), and a diaphragm 34 is encapsulated at the vibration access port 33;

The third tube cavity 302 extends along a second direction (the vertical direction in the figure), one end of which is communicated with the second tube cavity 301 (the upper end in the figure), and the other end forms the port for liquid in and out 31 (the lower end in the figure), wherein the first direction and the second direction are perpendicular to each other. In addition, the width of the second tube cavity 301 is larger than the widths of the first tube cavity 300 and the third tube cavity 302.

In one embodiment, the second cavity 30 is narrowed near the port for liquid in and out 31, and preferably, is narrowed gradually, or the third tube cavity 302 is narrowed gradually from top to bottom. The inner diameter of the port for liquid in and out 31 is 0.1 to 1 mm, preferably 0.3 to 0.6 mm, and the sample-adding tube with the inner diameter of this range is easier to maintain its consistency during processing, so that the uniformity of the size of the droplets can also be ensured.

The sample-adding tube 3 may be made by integral molding. A single sample-adding tube 3 may be used as a consumable material, and in combination with a sealing cap 35. The sealing cap 35 is sleeved on the liquid injection port 32 and/or the port for liquid in and out 31 of the sample-adding tube 3 to maintain the seal of the entire sample-adding tube 3. When in use, it is only necessary to remove the sealing cap 35 and cooperate the liquid injection port 32 with the driving source, and to immerse the port for liquid in and out 31 in the mineral oil. With energy (high frequency vibration wave) being given to the diaphragm 34, uniform droplets can be rapidly formed. The consumables may be made of polymer materials, and such that long-term stable preservation of mineral oil is ensured. The diaphragm 34 is welded by laser to ensure consistency and flatness, and to ensure the consistency and precision in the process of energy transmission. The sealing cap 35 is made of thermosetting polymer material to ensure long-term reliable sealing.

In addition, a holder 36 provided with a plurality of holding cavities for holding sample-adding tubes 3 may be used. The driving source is connected to the liquid injection port 32. The driving source may be a pump, such as a plunger pump, and communicates with the liquid injection port 32 through a three-way valve.

The vibration source can apply vibration to the vibration access port 33. The vibration source comprises a vibration generator, which adopts various high-frequency vibration generators conventional in the art, such as a high-frequency mechanical vibration generator, for example, the piezoelectric ceramic 40 matching with a signal source 41, a voice coil motor. MEMS, etc.

Uniform and stable droplets can be prepared by the above-mentioned droplet generation device. A typical preparation process comprises the following steps:

Feeding the first liquid 4 into the first cavity 20 and keeping the first cavity 4 stationary; feeding the second liquid 5 into the first liquid 4 through the second cavity 30 having the port for liquid in and out 31, wherein a third liquid 6 immiscible with the second liquid 5 is used to drive the second liquid 5 to flow and apply vibration to the third liquid 6; the second liquid 5 is wrapped by the first liquid 4 to form droplets, which then enters the first cavity 20; Wherein, the first liquid 4 and the third liquid 6 are continuous phases, and the second liquid 5 is a dispersed phase. More further, the first liquid 4 and the third liquid 6 are oil phases, such as mineral oil, and a surfactant is added to the first liquid 4. The addition of a surfactant is preferred for it is helpful to improve the stability of the droplets prepared and stored in the first cavity 20. The second liquid 5 is an aqueous phase containing biological or chemical substances to be detected, such as a sample mixture.

During the preparation process, the feed speed of the second liquid may be 2 to 200 μL/min; preferably, the feed speed of the second liquid is 10 to 50 μL/min. The vibration frequency is 10 Hz to 1 KHz; the vibration amplitude is 5 to 300 μm; preferably, the vibration frequency is 150 Hz to 600 Hz; the vibration amplitude is 10 to 50 μm. Through the effective control of parameters, droplets of uniform size can be prepared, and the preparation is more controllable.

In each of the above embodiments, in order to prevent cross-contamination of different samples, the droplet generation tube can be disassembled and replaced after use.

As can be seen from the above embodiments, there are various technical advantages, including but not limited to:

1. Uniform and trace droplets can be formed through a simple structure, which has technical advantages such as repeatable and continuous preparation, and can be applied in clinical diagnosis, gene expression analysis, microorganism detection and other scenarios, and has good practicability;
2. Droplets are generated within the droplet generation tube. In the case of a given device, the generation effect of droplets is mainly affected by the vibration frequency, and is not sensitive to the small change in the inner diameter of the droplet generation tube, and the position where the droplet generation tube is inserted below the oil phase interface, and the formula composition of the oil phase, etc. Therefore, the consistency and controllability of droplet generation are significantly improved;
3. The device of some embodiments is provided with a debubbling structure and function, which can effectively achieve debubbling while cleaning, to avoid interference with the droplet generation due to the existence of bubbles;
4. The control requirements for the inner diameter of the droplet generation tube are significantly reduced, and the cost can be reduced accordingly. Therefore, the droplet generation tube can be used as a consumable to prevent cross contamination between the generated samples. A disposable droplet generation tube can be used;
5. The prepared droplets are directly stored in the droplet receiver without transfer. The prepared droplets can be directly PCR amplified and analyzed, to realize the integration of droplet generation and analysis;
6. In the above application, the sample can divided into micro-droplets of uniform size for detection, which has the advantages such as high specificity, high sensitivity and high accuracy of detection results. It is also more beneficial to analyze and study samples at the microscopic level by detecting single droplets;
7. The droplet generation system and method of the present disclosure has a wide range of application fields. The applicable fields comprise but are not limited to the following aspects;

Clinical diagnosis: 1), non-invasive prenatal diagnosis: detection of fetal genetic diseases through maternal free DNA fragments: 2), cancer marker detection; 3), virus detection; 4), copy number variation analysis; 5), mutation detection.

Gene expression analysis (mainly analysis of genetic differences between cells): 1), gene expression analysis; 2), single cell gene expression analysis.

Next-generation sequencing: 1), verification of sequencing results; 2), quality control for sequencing library.

Quantitative of genetically modified components: analysis of genetically modified components.

Microorganism detection: 1), microorganism detection of water samples: 2), pathogenic microorganism detection.

The embodiments described above are only for illustrating the technical concepts and features of the present disclosure, and are intended to make those skilled in the art being able to understand the present disclosure and thereby implement it, and should not be concluded to limit the protective scope of this disclosure.

What is claimed is:

1. A droplet generation method, using a droplet generation device and a droplet receiver, wherein, a first liquid is placed in the droplet receiver, the droplet generation device comprises a fluid passage, an accommodating cavity having a volume which is variable and in liquid communication with the fluid passage, and a droplet generation tube having a first port and a second port, wherein the first port is in liquid communication with the accommodating cavity, an inner diameter of the second port is greater than 0.2 mm; wherein the droplet generation method comprises:

S1, transferring a second liquid into the droplet generation tube, wherein the second liquid is a liquid immiscible with the first liquid;

S2, inserting the droplet generation tube into the first liquid, and keeping the second port of the droplet generation tube being below the a liquid surface of the first liquid; and S3, while having the droplet generation tube and the droplet receiver remain stationary with respect to each other, controlling the volume of the accommodating cavity by subjecting the accommodating cavity to a periodic change while simultaneously injecting a driving fluid into the fluid passage to drive the second liquid to move, thereby generating droplets of the second liquid;

wherein at least a part of a wall constituting the accommodating cavity is a movable part, a vibration mechanism is connected with the movable part, to subject the periodic change by making the movable part vibrate;

wherein the periodic change is a compression-recovery reciprocating change, or an expansion-recovery reciprocating change, or a compression-recovery-expansion-recovery reciprocating change.

2. The droplet generation method according to claim 1, wherein, in step S3, droplets are formed in the droplet generation tube, and then flow out through the second port and enter the droplet receiver.

3. The droplet generation method according to claim 1, wherein, in step S3, the generated droplets are formed in the droplet generation tube, and then flow out through the second port and enter the droplet receiver.

4. The droplet generation method according to claim 1, wherein a frequency of the periodic change is 10 Hz to 1 KHz.

5. The droplet generation method according to claim 4, wherein, the frequency of the periodic change is 100 Hz to 600 Hz.

6. The droplet generation method according to claim 1, wherein the movable part is composed of a metal or non-metal diaphragm; and/or, one or more of a top or the surrounding side walls of the accommodating cavity are provided with the movable part.

7. The droplet generation method according to claim 1, wherein the movable part is connected with the vibration mechanism through a connecting mechanism, and in step S3, the vibration mechanism drives the movable part to vibrate reciprocally and synchronously to control the volume of the accommodating cavity to change periodically.

8. The droplet generation method according to claim 7, wherein a direction of the reciprocating vibration of the vibrating mechanism is vertical direction; and a vibration amplitude is 5 μm to 1000 μm.

9. The droplet generation method according to claim 1, wherein the droplet generation method comprises a step of cleaning of the accommodating cavity and the droplet generation tube after step S3 or before step S3.

10. The droplet generation method according to claim 9, a first plunger pump is used in the step of cleaning, and a second plunger pump is used in the step of injecting the driving fluid into the fluid passage in S3, the first plunger pump has a volume larger than a volume of the second plunger pump, and the fluid passage is connected to the first plunger pump and the second plunger pump through a three-way valve.

11. The droplet generation method according to claim 1, wherein an inner diameter of the first port is larger than the inner diameter of the second port.

12. The droplet generation method according to claim 1, wherein the inner diameter of the second port is 0.2 mm to 1 mm.

13. The droplet generation method according to claim 1, wherein the inner diameter of the second port is 0.3 mm to 0.6 mm.

14. The droplet generation method according to claim 1, wherein a frequency of the periodic change is 150 Hz to 300 Hz.

15. The droplet generation method according to claim 1, wherein a vibrating mechanism is set abutted against the movable part, and in step S3, the vibrating mechanism transmits a reciprocating vibration to the movable part to make the movable part vibrate, so as to control the volume of the accommodating cavity to change periodically.

16. The droplet generation method according to claim 1, wherein the droplet generation tube comprises a tapered tube portion, and two ends of the tapered tube portion respectively form the first port and the second port; and a taper angle of the tapered tube portion is 0.05 to 0.1, a vibration frequency of the movable part is 100 Hz to 600 Hz, and a vibration amplitude is 10 μm to 300 μm; or a taper angle of the tapered tube portion is 0.1 to 0.2, a vibration frequency of the movable part is 100 to 300 Hz, and a vibration amplitude is 10 μm to 600 μm.

17. The droplet generation method according to claim 1, wherein in step S3, the driving fluid is a liquid and has an injection speed of 2 to 200 μL/min.

18. The droplet generation method according to claim 1, wherein the accommodating cavity is an annular cavity with an inner diameter of 4 to 6 mm, and an inner peripheral side wall of the accommodating cavity extends in a vertical direction.

19. The droplet generation method according to claim 1, wherein in step S1, the second liquid is sucked into the droplet generation tube through the second port of the droplet generation tube, which is followed or not followed by sucking a portion of first liquid into the droplet generation tube;

before step S3, the driving fluid and the second liquid are located in the droplet generation tube in sequence from top to bottom; or, the driving fluid, the second liquid and the portion of first liquid are located in the droplet generation tube in sequence from top to bottom.

20. The droplet generation method according to claim 1, wherein the first liquid contains a surfactant, the second liquid is an aqueous phase containing biological or chemical substances to be detected, a diameter of the droplets is 50 μm to 250 μm.

* * * * *